United States Patent [19]

Knightly

[11] Patent Number: 5,662,956

[45] Date of Patent: Sep. 2, 1997

[54] PAN AND MOLD RELEASE FOR FOODS

[75] Inventor: William H. Knightly, Wilmington, Del.

[73] Assignee: Emulsion Technology Inc., Wilmington, Del.

[21] Appl. No.: 413,688

[22] Filed: Mar. 30, 1995

Related U.S. Application Data

[63] Continuation-in-part of Ser. No. 852,395, Mar. 16, 1992, abandoned.

[51] Int. Cl.$^6$ .................................................. A23D 7/00
[52] U.S. Cl. ................................... 426/601; 426/662
[58] Field of Search ............................... 426/601, 662

[56] References Cited

U.S. PATENT DOCUMENTS

| | | | |
|---|---|---|---|
| 3,661,605 | 5/1972 | Rubin et al. | 106/244 |
| 3,821,007 | 6/1974 | Carey | 106/150 |
| 3,896,975 | 7/1975 | Follmer | 222/192 |
| 3,906,117 | 9/1975 | Gawrilow | 426/420 |
| 4,142,003 | 2/1979 | Sejpal | 426/601 |
| 4,163,676 | 8/1979 | Konigsbacher | 106/243 |
| 4,188,412 | 2/1980 | Sejpal | 426/609 |
| 4,192,898 | 3/1980 | Hanson | 426/250 |
| 4,211,802 | 7/1980 | Carey | 426/609 |
| 4,315,040 | 2/1982 | Heine et al. | 426/609 |
| 4,339,465 | 7/1982 | Strouss | 426/293 |
| 4,420,496 | 12/1983 | Hanson, Jr. | 426/609 |
| 4,479,977 | 10/1984 | Dashiell et al. | 426/609 |
| 4,684,526 | 8/1987 | Knightly | 426/19 |

FOREIGN PATENT DOCUMENTS

| | | |
|---|---|---|
| 48-32345 | 10/1973 | Japan . |
| 49-21074 | 5/1974 | Japan . |
| 59-122530 | 7/1984 | Japan . |
| 61-141842 | 6/1986 | Japan . |
| 61-111653 | 6/1986 | Japan . |
| 64-37249 | 2/1988 | Japan . |
| 63-279751 | 11/1988 | Japan . |
| 63-317042 | 12/1988 | Japan . |
| 1183039 | 10/1985 | U.S.S.R. . |
| 1340711 | 9/1987 | U.S.S.R. . |
| 91/05481 | 5/1991 | WIPO . |

OTHER PUBLICATIONS

Kirk–Othmer 1981 Encyclopedia of Chemical Technology 3rd edition, vol. 14 John Wiley & Sons New York pp. 250–269.
The Lecithen Book Central Soya pp. 1–12.
Peterson 1978 Encyclopedia of Food Science AVI Publishing Company Inc. Westport CT pp. 461–467.
Kirk–Othmer Encyclodedid of Chemical Technology Third ed vol. 8 John Wiley & Sons New YOrk 1979 & pp. 910–920.
Fennema 1985 Food Chemistry second ed. Marcl Dekker Inc. New York pp. 169–175.
I. Fennema, "Food Chemistry", p. 170, 1985.
Bakery Production And Marketing, "Spray Solution Doubled Pan Glaze Life", ICI Americas, Inc. (1979).
Kirk–Othmer Encyclopedia of Chemical technology, Third Ed., vol. 8 "Diruetics to Emulsions", pp. 910, 913, 916, 917 & 920.

Primary Examiner—Carolyn Paden
Attorney, Agent, or Firm—CBL & Hutz

[57] ABSTRACT

An emulsion composition containing
  a) water in an amount up to 75%;
  b) oil, and
  c) hydrophilic lecithin which is capable of forming the emulsion and providing release properties and having a high solids content. This emulsion composition can be used for depanning baked goods.

22 Claims, No Drawings

PAN AND MOLD RELEASE FOR FOODS

This is a continuation-in-part of Ser. No. 07/852,395, filed Mar. 16, 1992, now abandoned.

BACKGROUND OF THE INVENTION

Traditionally, pan and mold releases used in the food industry, especially the baking industry, have been composed of fat or oils (animal or vegetable) with, in most cases in recent years, certain additives such as lecithin, silica, and cereal flour used to improve the release.

In the production of pan bread (so-called hearth breads are not baked in pans) and cakes, the pans used are usually coated when manufactured with a silicon glaze to aid in the release of the baked food. After some use, the pans are removed from the bakery to be commercially cleaned and reglazed, at considerable cost, due to the wearing away of the glaze and the buildup of residue.

It has been found that coating the pans with a film of fat or oil prior to each use both improves release and extends the life of the glaze when used. The inclusion of certain additives, such as lecithin, a naturally occurring surfactant, improves the release action of the fat or oil coating.

Similar type coatings or lubricants are used in the food industry in general. They are used to reduce sticking to conveyor belts, to improve the cutting actions and prevent sticking of cutting blades used to cut confectionery pieces, to lubricate belts and moving parts used to process foods, to coat packaging materials to prevent sticking and many other applications. Such releases differ basically in viscosity.

The coating may be applied manually, but, in large bakeries, is usually sprayed on the pans in liquid form using especially designed equipment that automatically sprays each pan with the proper amount of release, applied to the proper area of the pans.

Unfortunately, many of the fats, oils and other additives contain impurities such as rosins or are polymerized by heat resulting in the build-up on the pan or other equipment of carbonaceous encrustation, composed of rosins, polymerized oils and entrapped burned residues of the baked food.

Bread, because of its relatively low sugar and shortening content, is more easily released from the pan than is chemically leavened cake or yeast-raised sweet goods of high sugar and fat content. For this reason, the release used for bread and rolls may be simply a fat or an oil, with or without lecithin. With cake, which tends to be sticky, additional additives such as silica or cereal flours and/or starches may be included to improve release.

Strouss, in U.S. Pat. No. 4,339,465 issued Jul. 13, 1982 teaches a dispersion of a liquid emulsifier in water with or without a maximum of 4% "unbleached liquid soya lecithin", preferably 2% with a minimum of 80% water. Strouss adds such lecithin as an optional ingredient only to increase the adhesion properties of the composition of matter. I have found that unbleached soya lecithin, while usable if emulsifiable, is undesirable since it imparts a dark color to the emulsion and possesses an undesirable beany odor. I can obtain the increased viscosity and resulting improved adhesion by adding silica, especially fumed silica, and by reducing the water content of the aqueous phase. I can also obtain greater viscosity by adding cereal products such as but not limited to finely milled corn flour or starches to the aqueous phase. Gums such as but not limited to alginate, cellulose, carrageenin and guar will also increase the viscosity of the aqueous phase. The ideal pan release would be economical, have a low viscosity so as to be applied in a very thin film, would not smoke or give off foul odors in the oven or elsewhere, would not impart off flavors or odors to the food product, would provide good release properties in that little, if any, product would stick in the mold or pans, would extend the glaze life of the mold and pans and would not contribute to the buildup of carbonaceous matter on the mold or pan.

Ideally, the liquid release would obtain its fluidity from a solvent such as water. Water is about the lowest cost and least troublesome solvent available. It is nontoxic, odor and flavor free, is not flammable and does not smoke when exposed to high heat, gives off no pollutants and contains no rosins or polymerizable material which might deposit on the pans.

Japanese Patent No. 141 842 issued to Takahashi discloses the formation of a release for use in aerosol containers under pressure from a gas such as nitrogen. Takahashi teaches the formation of an oil-in-water type emulsion with up to 5% lecithin of unknown HLB, an edible oil content of 20–45%, an emulsifier such as sorbitan or polyglyceryl esters and water at 45 to 78.5%. Takahashi requires very expensive emulsifiers to form the emulsion. In addition, the solids content of Takahashi is very low.

The primary release agents, such as fats and oils and conventional lecithin are not soluble in water, thus, would have to be dissolved in expensive and unsafe solvents such as alcohol or hexane. Conventional lecithin has an H.L.B. of 2 to 4.

Hydrophilic lecithin would have an H.L.B. value of greater than that of commercial lecithin.

SUMMARY OF THE INVENTION

An object of this invention is to have an emulsion composition comprising water, oil, and lecithin that has a high solids content.

Another object of this invention is to develop an oil-in-water emulsion that avoids the problems of the prior art.

Another object of this invention is to develop an emulsion that does not require expensive emulsifiers.

Another object of this invention is to develop a process for coating pans with the emulsion composition.

Another object of this invention is to develop an emulsion composition that can have all natural ingredients.

What I have found is that the primary release agents can be applied economically and safely in an aqueous media if emulsified as an oil-in-water-type emulsion. Since water is the external phase, the viscosity of the composition can be adjusted to that desired simply by adding more or less water. The amount of the composition deposited on the pan or baking surface can likewise be controlled by adjusting the amount of water in the emulsion.

More specifically, I have found that the hydrophilic lecithins alone are capable of forming the emulsion and providing release and that other additives such as fat or oil may not be required. When required, these additives must be soluble in the lecithin or capable of being emulsified into the composition or of being dispersed in the aqueous phase of the emulsion.

Where desirable, a hydrophilic surfactant, with an hydrophile-lipophile-balance (HLB) about 7 or greater, may be used as a coemulsifier with the lecithin. The combined HLB of the lecithin and the coemulsifier should be such as to form a stable lipid in water emulsion; i.e. HLB about 7 or greater. Lipophilic surfactants may be included if desired for their known release properties.

The lecithin must be present in the emulsion. Preferably the lecithin is an amount greater than 2%, more preferably in an amount greater than 4%, and even more preferably in an amount between about 10 to about 15%. The lecithin can be in any form such as but not limited to liquid, plastic or powder. The preferred condition is in a powdered form. The lecithin preferably has a high solids content. The lecithin solids content is at least about 30%, and preferably from at least about 50% and most preferably at least about 60% at room temperature (70° F.). The lipid system of high solids content gives a far superior release system as compared with vegetable oils of low solids, such as soya oil.

Fats or oils may be included in the emulsion for purposes of economy; i.e. fats and oils do contribute to release at low cost, but there use is optional. In any event, they must be emulsified into the aqueous phase by the hydrophilic lecithin and (if used) its coemulsifiers.

The lipid solids content increases the viscosity. The oils in the invention can be any edible oil. Preferably the oil has a high solids content such as, but not limited to vegetable oil.

The preferable embodiment has a lipid phase which uses both oils and lecithin with a high solids content. The solids content of the lipid phase is at least about 5% and preferably at least about 8% and most preferably at least about 10% at room temperature (70° F.).

This emulsion does not have to contain a liquid emulsifier, an ethoxylated fatty acid ester of sorbitol or mono and diglyceride compounds.

The amount of water contained in the emulsion is unimportant, so long as the emulsion is an oil-in-water type i.e. the external phase must be an aqueous phase. Oil-in-water emulsions containing as little as 25% water are known; e.g. mayonnaise. I have found that an emulsion of low water content may be desirable when formulating an oil-in-water type pan or mold release. A high lipid, low-aqueous-phase emulsion has greater adhesion when sprayed onto vertical walls; e.g. the sides of bread or cake pans, dough troughs and the like. The amount of water should not exceed 75% and preferably not exceed 70%, and even more preferably should be about 50% of the emulsion.

I can obtain the increased viscosity and resulting improved adhesion by adding silica, especially fumed silica, and reducing the water content of the aqueous phase. I can also obtain greater viscosity by adding cereal products such as but not limited to finely milled corn flour or starches to the aqueous phase. Gums such as but not limited to alginate, cellulose, carrageenin and guar will also increase the viscosity of the aqueous phase. In addition preservatives such as but not limited to, propionic acid and its salts and sorbic acid and its salts can optionally be added.

This emulsion can be coated, such as but not limited to, by spraying or brushing on pans. The emulsion can be applied by means of an aerosol spray.

EXAMPLES

1. A pan-release emulsion for the purpose of improving release of a commercial cupcake formulation from pans was formulated as follows:

| | |
|---|---|
| Lecithin (HLB 7/8) | 8.4% |
| Glyceryl monooleate (HLB 2.8) | 7.5% |
| Polysorbate 60 (HLB 14.9) | 5.0% |
| Vegetable Oil (Coconut, 92 FMP) | 15.0% |
| Water | 52.0% |

-continued

| | |
|---|---|
| Fumed Silica | 1.5% |
| Corn Flour | 10.0% |

The oil and emulsifier phase was heated to 120° F., the water to 122° F. and about 75% of the latter added slowly to the lipid phase to form a thick water in oil type emulsion. The speed of the Eppenbach mixer was then increased to 60% of the full speed with the addition of the remainder of the water. The emulsion inverted to a very fine oil-in-water type, with a much lower viscosity. It was then cooled to 100° F. Silica, corn flour and sorbic acid were added slowly to the emulsion. When these components were thoroughly dispersed, the weight of the emulsion was adjusted with ion exchanged water to compensate for evaporation.

A second sample was prepared, similar in all respects to the first, with the exception that no coconut oil was added. The difference in weight was compensated for by the addition of water.

Three days after preparation, with storage of the emulsions at refrigeration temperature, commercial cupcake pans were manually coated (brushed) with each. A typical chocolate cupcake batter, containing approximately 30% total sugar (about 85/15, sucrose/corn syrup) was deposited into each cup and baked in the laboratory. After cooling, each set of pans was inverted and tapped lightly. All cakes dropped from the pans with no "stick-ups"; however, those coated with the release containing no oil required more tapping to dislodge the cakes. When 15% canola oil was added to the release containing only emulsifier, it was found that the oil was readily emulsified and ease of removal of the cake from the pans greatly improved.

2. The pan release emulsion of Example 1 was repeated, using 15% Canola oil. The procedure for manufacture was identical as was the composition except for the oil. A type of small vanilla cake was selected for evaluation since the cake formula has a severe tendency to stick to the pans due to its high sugar content (98% based on flour weight). In addition, because a large quantity of an oily viscous commercial release is required for release, the bottom of the cake is greasy, soiling the consumers' fingers. The cake also leaves an oily ring on the cardboard bottom of its package.

The aqueous pan release was applied manually to the pans with a brush, batter deposited and the cakes baked. No sticking was observed. The bottoms of the cakes were clean and free of grease.

3. A second set of release emulsion was prepared; a blend of 15% lecithin, 15% oil and 70% water was prepared. The lecithin was determined to have a HLB value of 7–8. The oil was a soya salad oil purchased at a local food market. The lipid phase (12 oz) was heated to 130° F. in a water bath and charged into a Waring blender. Tap water at 150° F. (28 ozs) was added to the lipid phase slowly at low speed to form a thick water in oil emulsion (about 75% of total water). The speed of the blender was then increased to about 60% of full speed and the remainder of the water added. The emulsion immediately inverted to an oil-in-water type emulsion with a significant decrease in viscosity. The viscosity resembled that of a light whipping cream. A similar emulsion was prepared with only water. While fluid and pumpable, the viscosity was close to that of mayonnaise.

The emulsions were stored at room temperature for two weeks and checked periodically for emulsion separation. None was observed.

At the end of the emulsion stability test period, both emulsions were tested for release properties as follows:

A cupcake batter with the following composition was prepared, based on flour weight.

Flour—100%

Shortening—37.5%

Sugar—87.2%

Baking Powder—6.2%

Whole Eggs—28.1%

Milk (whole fluid)—78%

Salt—1.3%

Vanilla—2%

After creaming the dry ingredients with the shortening, the liquid ingredients were added and mixed to a smooth batter. Batter, 91 grams, was charged into each cup of a commercial cupcake "strap" containing six cups per strap. Prior to adding the batter, each cup was coated manually (brushed) with the test release emulsion.

The cupcake straps were placed in an oven at 375° F. and baked for 25 minutes at this temperature. After baking, the straps were placed on a cooling rack for 10 minutes, then inverted and tapped once on a cutting board. With both emulsions, the cupcakes fell from the cups with no stickups.

4. A series of emulsions was prepared by the inversion technique similar to that of example 3. The lecithin evaluated were as follows:

| | |
|---|---|
| HR4B (Central Soya) | HLB-9 |
| Blend Max (Enzyme Modified-Central Soya) | HLB-9 |
| Centrolene A (Hydroxylated-Central Soya) | HLB-9 |
| Centromix (+ Ethoxylated Monoester-Central Soya) | HLB-12 |

All emulsions were found to be stable when containing 54% water and 46% lipid phase (28% lecithin 18.8% soya oil). A test was scheduled at a commercial cake plant. An emulsion of 15% lecithin (HR4B), 15% 92° F. M.P. coconut oil and 70% water was prepared in the laboratory of the cake plant. The hydrophilic lecithin and coconut oil were heated to 130° F., the water to 150° F. The lecithin and coconut oil (heated) were charged into a Waring-type blender, and the hot water added slowly at about 60% full speed. The water-in-oil emulsion thickened until inversion took place. The remainder of the water was added rapidly to the now thinner oil-in-water emulsion.

Chocolate cupcake batter and cupcake pans were obtained from the production area and brought to the laboratory. The standard weight of batter was added to the cups after manually brushing on the release emulsion. The cakes were baked in the laboratory oven, cooled for 10 minutes, and the pans inverted. With a light tap on the laboratory bench, the cakes were released easily from the pans. As in the first test with cupcakes, the tightly emulsified oil of the release resulted in a rounded top and close grain on the bottom quarter of the cupcake.

The emulsion was reheated to 150° F. and sufficient oil at 130° F. added to bring the emulsion to 24.4% oil and 13.3% lecithin. The baking procedure was repeated, and a more desirable symmetry and grain structure was obtained.

A third emulsion was prepared containing 35.7% oil, 14.3% hydrophilic lecithin and 50% water. This emulsion provided excellent release, good symmetry (flat top) and desirably open grain.

5. An additional series of emulsions were prepared using hydrophilic lecithin (HR2B, Central Soya) soya oil and glyceryl monooleate, a low HLB lipid with good lubricating properties and water. The release properties of these emulsions were tested with the high sugar vanilla cake (98% sugar, flour weight basis) of Example 2. The emulsions were prepared using a standard laboratory mixer (Hobart) and not by the inversion technique. The emulsions were stable for a short period of time, sufficient to allow them to be applied by brush manually to the pans. The following emulsions provided good release with no greasy bottoms to the cakes:

| | Lecithin | Glyceryl-monooleate | Oil | Water |
|---|---|---|---|---|
| 1 | 7.5% | 7.5% | 42.50% | 42.50% |
| 2 | 15.0% | 7.5% | 38.75% | 38.75% |
| 3 | 7.5% | 15.0% | 38.75% | 38.75% |
| 4 (Best) | 15.0% | 15.0% | 35.00% | 35.00% |

An additional emulsion was prepared using the inversion technique. This emulsion was composed of approximately 15% lecithin, 7.5% glyceryl monooleate, 7.5% soya oil and 70% water. The emulsion was still stable 1 week after preparation and provided excellent release properties with no greasiness on the cake bottom.

A sample of a pan release emulsion with 40% lipid phase, containing coconut oil (P.R. 940) was evaluated for comparison with a similar emulsion made with canola oil (P.R. 640). Both samples were evaluated in bread and it was reported by a commerical laboratory that both samples worked well and were superior to a commercial pan release.

Similar samples were also evaluated in two commercial bakeries and they reported that the sample P.R. 940 made with 92° F. MP coconut oil was superior to P.R. 640 in releasing sponge cakes. Both samples contained 40% lipid phase.

Samples were also prepared containing oils with higher lipid solids content. These oils were blends of coconut oil and hydrogenated soya oil. The type of oil used is not important except from a cost standpoint, since any number of oils could be used to provide the desired solids. The solids indices of each oil used is as follows:

| A 92° F. M.P. | | B 110° F. M.P. | |
|---|---|---|---|
| Solids at: | | | |
| °C./°F. | % | °C./°F. | % |
| 10/50 | 58.0 | 10/50 | 58.3% |
| 21.1/70 | 32.5 | 21.1/70 | 33.9 |
| 26.7/80 | 6.4 | 26.7/80 | 9.8 |
| 33.3/92 | 5.2 | 33.2/92 | 8.6 |
| 40.0/104 | 4.6 | 40.0/104 | 8.2 |

Vegetable oils, such as salad oils, previously used for preparing the emulsions would have no solids above 38° F.

Both samples were superior to a commercial release (soybean oil, lecithin and 20% mineral oil manufactured by Mallet & Co. under Vegalube 20). Sample 930A (92° F. M.P.) was superior at equivalent levels to the commercial release and could be used at 25–30% lower level. Sample 930B (110° F. M.P.) was superior to the commercial release and sample 930A. Even when used at ⅓ the level of the commercial pan release (1 gram per pan vs. 3 grams per pan) no sticking was observed. It was determined that both pan release emulsions performed well even in unglazed pans, which is highly unusual.

A second sample of the sample 930B, (with the 110° F. melting vegetable oil) was evaluated in a commercial bakery. It was confirmed that the pan release emulsions containing vegetable oil with the higher solid fat index were significantly superior to those with lower or no solids at application temperature. These samples, while containing high lipid solids from the vegetable oil, contained glyceryl monooleate and lecithin which contained no oil solids at application temperature. Lecithin of commerce contains about 40% residual soya oil.

Another sample of sample 930B (30% lipids; 110° F. vegetable oil and glyceryl monooleate) was evaluated in a commercial bakery. This sample was found to be far superior to any of the prior samples that they had evaluated for release purposes. Again, a few sponge cake samples required excessive depanning vacuum or "capping" to be removed from the molds, all other varieties of cakes were removed with ease.

It occurred to me that increasing vegetable oil solids still higher might further improve release, and it also occurred to me that glyceryl monoesters were available with many higher solid fat indices. Glyceryl monooleate has no solids at application temperature (70°–75° F.). Two glyceryl monostearates were commercially available (I.C.I. of America) one with an iodine value of about 50 (partially saturated) and another with an iodine value of less than 1 (fully saturated). The typical solid fat indices of these products is as follows:

| Solids at: °C./°F. | Partial (ICI-Atmul 5000) % | Fully (ICI-Atmul 1500) % |
|---|---|---|
| 10/50 | 39 | 100 |
| 21.1/70 | 26 | 100 |
| 26.7/80 | 22 | 100 |
| 33.3/92 | 14 | 100 |
| 38/100 | 9 | 90–100 |

I considered the solids at application temperatures of 70° and 40% lipid phase in the emulsion. I found the following Solids indices with the added solids from glycerol monostearate ("G.M.S."):

A—Typical Release Formula @ 40% lipid phase

20% Vegetable Oil, 110° F. M.P.,

20% Lecithin and

60% Water.

As an example, a formula such as A above would have (20%×33.9% solid oil at 70° F.) or 6.78% non-lecithin lipid solids on application at 70° F., since all the non-lecithin solids are coming from the vegetable oil.

If part of the lipid phase is substituted with glyceryl monooleate ("G.M.O."), for improved release properties, no additional release solids are obtained, since G.M.O. is a liquid at application temperature. However, when part of the lipid phase is substituted with glyceryl monostearate, which also aids in release, additional solids are obtained.

B—When the lecithin is reduced to 12% and 7% glyceryl monostearate (1V50) is substituted, the formula would supply the 6.78% non-lecithin solids as in A above, from the vegetable oil, but also supply (7%×26% solids at 70° F.) or 1.82% solids from the G.M.S. for a total non-lecithin lipid solids of 8.6% at application temperature (70° F.).

I also substituted 7% lecithin with an equivalent amount of glyceryl monostearate with an 1V<1. The G.M.S. would supply 7% additional solids since it is 100% solid at 70° F. This would result in the release emulsion having (7+6.38%) a total of 13.38% release solids on application.

The use of high solids index G.M.S. is one way to increase lipid solids at application temperatures. While this might not be necessary in all cases, (e.g. bread) it would be desirable in others (e.g. sponge cake). It is also possible to obtain vegetable oils with higher solid fat indices (S.F.I.) than those used in these studies which might be a more economical approach.

Cake batter is deposited into the pans or molds usually at a temperature of 70°–75° F., so the solids content at these temperatures should be most significant.

To obtain data substantiating whether the use of higher levels of lipid solids via the G.M.S. in the emulsion would improve release, three samples were prepared and tested. These contained 30% lipid phase, with 7.2% glyceryl monoester substituting for 4.2% vegetable oil and 3.0% lecithin. The monoesters used were glyceryl monooleate (which contains no solids) and two monostearates, 1V50 and 1 V<1, the former possessing 22% solids at 70° F., the latter, 100%. Improved results were obtained with added G.M.S.: the best with the sample 100% solid at 70° F.

It was also found at this time that higher solids provided improved cake volume and symmetry. It is known that conventional oil based releases tend to weaken gluten structure resulting in a reduced volume and less desirable symmetry.

As a result of the improvements obtained during the tests, additional samples were produced with 35% lipid phase and higher solids index due to G.M.S. These also were evaluated and it was found that higher levels of lipid solids resulted in better release, better volume and better symmetry.

The best results were obtained with the G.M.S. (1V<1) that provided 100% solids at application temperature, but the viscosity of the emulsion with 35% lipid phase was deemed too high for ideal spraying at room temperature.

A series of release samples were prepared. These contained (1) an acetylated monoglyceride at 5% to replace the G.M.S. in an emulsion with 30% lipid phase, (2) an emulsion containing 30% lipid phase and 5% G.M.S., 1V50 (3) an emulsion containing 40% lipid phase with 7% G.M.S., 1V50 and (4) an emulsion prepared in accordance with the patent of Takahashi, J. P. 141842 which most closely approaches my application in composition.

COMPARATIVE RESULTS

The emulsion prepared from Takahashi was as follows:

| | Amount | Amount of Solids in Lipid Phase at 70° F. |
|---|---|---|
| a) Lipid Phase | | |
| Vegetable oil (Canola, no solids) | 30% | 0 |
| Lecithin (Regular, H.L.B. 2) | 2.5% | 1.5 |
| Monoglyceride (1V50) | 1.0 | 0.2 |
| TOTAL | 33.5% | 1.7% |
| b) Water Phase | | |
| Ethoxylated Mono MLB 10–12 | 1.0 | 0 |
| Water | 65.5% | 0 |
| TOTAL | 100% | 0 |

This emulsion was prepared by the inversion technique for best stability.

The results of this study again showed that increased lipid solids provided superior release. Best results were obtained with acetylated monoglycerides in the 30% lipid phase emulsion and the G.M.S. (1V50) at 7% in a 40% lipid phase emulsion. All emulsions contained vegetable oil with a M.P.

of 110° F., except the Takahasai emulsion (J. P. 141842). The emulsion of Takahashi (J. P. 141842) did not perform as well as any of the emulsions prepared with high lipid solids. Of course Takahashi is not using a hydrophilic lecithin, but depending on an added hydrophilic emulsifier (Ethoxylated mono.) for stability.

In view of the excellent release qualities obtained with the acetylated monoglyceride, one was obtained with even higher solids index (Grindsteds Cetodan 70-00K). This provided better results than the original acetylated monoglyceride tested (Cetodan 90-40K). Both emulsions with acetylated monoglyceride gave excellent release at 10% in a 40% lipid phase emulsion when tested. However, the viscosity was considered too thin and the release ran down the sides of the molds and puddled on the bottom.

As a result, samples were prepared containing 50% lipid phase, containing 12.5% Cetodan (both Cetodan types high and low solids) and tested. Perfect release was obtained with both samples, again demonstrating that higher lipid solids provide superior results. At 50% lipid phase, the viscosity was about ideal for application to mold sidewalls and no puddling occurred.

While there is shown and described herein certain specific structure embodying the invention, it will be manifest to those skilled in the art that various modifications and rearrangements of the parts maybe made without departing from the spirit and scope of the underlying inventive concept and that the same is not limited to the particular forms herein shown and described.

I claim:

1. An oil-in-water emulsion composition comprising:
   a water phase comprising water in an amount up to about 75%; and
   a lipid phase comprising oil and about 10 to about 15% of hydrophilic lecithin wherein said hydrophilic lecithin is capable of forming the emulsion and providing release properties and
   wherein said emulsion has a lipid solids content of at least about 5% at 70° F.

2. The composition as claimed in claim 1, wherein said water is present in an amount of about 50%.

3. The composition as claimed in claim 1, wherein said lecithin has a H.L.B. value about 7 or greater.

4. The composition as claimed in claim 1, further comprising the addition of a surfactant.

5. The composition as claimed in claim 4, wherein said lecithin and said surfactant have a H.L.B. value of about 7 or more.

6. The composition as claimed in claim 1, further comprising the addition of a co-emulsifier wherein said lecithin and co-emulsifier together have a H.L.B. value of about 7 or above.

7. The composition as claimed in claim 1, wherein said lecithin is in an amount of at least about 10% by weight.

8. An oil-in-water emulsion composition comprising:
   a water phase comprising water in an amount up to 75%; and
   a oil phase comprising oil and
   hydrophilic emulsifier comprising lecithin whereby said lecithin is capable of providing release properties, and said hydrophilic emulsifier has a H.L.B. value about 7 or greater, and
   said emulsion has a lipid solids content of at least 5% at 70° F.

9. The composition as claimed in claim 8, wherein said water is present in an amount up to 70%.

10. The composition as claimed in claim 8, wherein said lecithin is in an amount of at least 4%.

11. The composition as claimed in claim 10, wherein said lecithin is in an amount of about 10 to about 15%.

12. The composition as claimed in claim 8, further comprising the addition of a co-emulsifier wherein said lecithin and co-emulsifier together have a H.L.B. value of about 7 or greater.

13. The composition as claimed in claim 8, wherein said lecithin is in an amount of about 10 to about 15% by weight, based on the total composition.

14. An oil-in-water emulsion composition comprising:
    a water phase comprising:
      (a) water in an amount up to about 75% and
      (b) cereal flours, gums, starches or a mixture thereof and
    a lipid phase comprising oil and hydrophilic lecithin wherein said hydrophilic lecithin is capable of forming the emulsion and providing release properties and
    wherein said emulsion has a lipid solids content of at least about 5% at 70° F.

15. The method of depanning baked goods which comprises coating a pan with a composition comprising:
    a water phase comprising water in an amount up to about 75%, and
    a lipid phase comprising oil and hydrophilic lecithin wherein said hydrophilic lecithin is capable of forming an oil-in-water emulsion and providing release properties and
    wherein said emulsion has a lipid solids of at least about 5% at 70° F.

16. The method of depanning baked goods as claimed in claim 15, wherein said coating is preformed by spraying.

17. The method of depanning baked goods as claimed in claim 16, wherein said method of spraying is from an aerosol can.

18. The method of depanning baked goods as claimed in claim 15, wherein said coating is preformed by brushing.

19. An oil-in-water emulsion composition comprising:
    a water phase comprising water in an mount up to about 75%; and
    a lipid phase comprising oil and hydrophilic lecithin wherein said hydrophilic lecithin has has a H.L.B. value of about 7 to 12 and is capable of forming the emulsion and providing release properties and
    wherein said emulsion has a lipid solids content of at least about 5% at 70° F.

20. An oil in water emulsion composition comprising:
    water phase comprising water in an amount up to about 75%; and
    lipid phase comprising oil and hydrophilic lecithin wherein said hydrophilic lecithin is capable of forming the emulsion and providing release properties and
    wherein said emulsion has a lipid solids content of at least 10% at 70° F.

21. The composition as claimed in claim 20, consisting of water in an amount up to about 50%, oil and hydrophilic lecithin and said hydrophilic lecithin is used to form the emulsion and to provide release support.

22. The composition as claimed in claim 8, wherein the lecithin has a H.L.B. value of about 7 to 9.

* * * * *